United States Patent [19] [11] 3,759,439
Cross et al. [45] Sept. 18, 1973

[54] BAG WITH TEAR STRIP
[75] Inventors: William Telford Cross, Cuddington; Margaret Lilian Steel, Runcorn; Stephen Edward Trueman, Warrington, all of England
[73] Assignee: Imperial Chemical Industries Limited, London, England
[22] Filed: Apr. 9, 1971
[21] Appl. No.: 132,674

[30] Foreign Application Priority Data
Apr. 14, 1970 Great Britain.................. 17,687/70

[52] U.S. Cl..................................... 229/66, 229/62
[51] Int. Cl............................................. B65d 33/00
[58] Field of Search..................... 229/66, 51 AS, 85

[56] References Cited
UNITED STATES PATENTS
3,616,990  11/1971  Powell ................................. 229/66
3,088,654  5/1963   Perino................................. 229/85
3,146,912  9/1964   Twersky.............................. 229/66
3,341,108  9/1967   Kirk.................................... 229/66
3,446,632  5/1969   Le Van........................... 229/85 X

FOREIGN PATENTS OR APPLICATIONS
1,359,938  3/1964   France................................. 229/66

Primary Examiner—Donald F. Norton
Attorney—Cushman, Darby & Cushman

[57] ABSTRACT

Plastic film having extending wholly or partly across it a flexible reinforcement having a highly localised line of weakness, the reinforcement being bonded to the surface of the film or incorporated partly or wholly within its thickness. The reinforcement may be, for example, a woven textile web material or plastic sheet. The resulting film may be used to make containers which can be easily opened by tearing along the line or lines of weakness in the reinforcement.

5 Claims, 29 Drawing Figures

BAG WITH TEAR STRIP

This invention relates to articles of plastic film, and in particular to articles of improved tearability comprising plastic film which is normally tearable only with difficulty.

Many articles of plastic film, for example films of polyethylene and poly(ethylene terephthalate), are tearable only with difficulty; or if very weak, they tend to tear in a haphazard fashion, normally because stretching of the film occurs before or during the tearing operation.

According to the present invention there is provided plastic film which has extending partly or wholly across it flexible reinforcement having a highly localised line of weakness, said reinforcement being bonded to the surface of the film or incorporated partly or wholly within its thickness.

The invention is particularly applicable to bags, sacks and other containers made from or comprising such plastic film, e.g. containers of the heat-sealed kind used for packaging frozen foods, confectionery, fertilisers and other goods which need to be protected from air and/or moisture. Where it is required that the tear commence at an edge of the film, as where a single sheet of film is to be torn, or at a common edge, as where a sheet of film is folded or where two sheets of film meet, the reinforcement and the line of weakness conveniently extends from that edge. Thus, in a further embodiment, we provide a bag or sack having two walls of the reinforced plastic film of the invention, wherein each reinforcement extends from a common edge for the two walls, preferably to another common edge of the said walls, and the reinforcements are arranged such that the lines of weakness are superimposible or substantially so. Preferably the reinforcement also extends outwardly beyond the edge of the wall or walls and has an incision in this extension leading into the line of weakness. When a single sheet of film is to be torn the reinforcement may be applied to one side of the film or to both sides. Where two sheets are to be torn simultaneously, as in tearing open a bag, then conveniently each sheet will have reinforcement on one side only.

As examples of plastic film which has been reinforced according to the invention may be mentioned polyethylene, polypropylene, poly(ethylene terephthalate), polyamide and polyvinyl chloride, and laminates e.g. plastic/paper, and plastic/metal foil laminates, e.g. polyethylene/aluminum laminates as well as plastic/plastic laminates.

The reinforcement may be a woven textile web which is long in comparison to its width, e.g. a tape or strip of scrim, e.g. of cotton or linen, or of net, e.g. nylon net of the kind commonly used for curtaining. Alternatively, it may comprise a pair of strips of film or tape which are arranged parallel and in abutting or closely spaced relationship. The reinforcement is disposed in such a way that a line of weakness extends in the required tear direction. Where the reinforcement consists of a single woven textile web, the required line of weakness is defined by any two adjacent warp or weft threads. Selection of the reinforcing material will, of course, be made with its ease of tearability in mind. Very strong reinforcing material, such as it itself difficult to tear, will not be employed.

Where the reinforcement is a pair of parallel abutting or closely spaced strips, the line of weakness lies between the two strips.

An alternative reinforcing material is a plastic, or a thin metal sheet or strip; this may be of any material which can be bonded to or incorporated partly or wholly within the thickness of the film and which is compatible with the film and the use to which the film is put. Examples of such reinforcing materials which conveniently may be employed as a pair of strips arranged parallel and in abutting or closely spaced relationship are adhesive regenerated cellulose strip, e.g. Sellotape (RTM), polyamide plastics e.g. nylon, polyesters, e.g. poly(ethylene terephthalate), polyvinylchloride, polyethylene and polypropylene; other plastic materials which may be used according to the invention will be apparent to the man skilled in the art. Total width of the reinforcing strip will usually be 0.2–1 inch, preferably 0.3–0.75 inch and its length (i.e. in contact with the film) preferably at least one inch.

While it may be convenient to apply to the plastic film reinforcement in the form of a preformed strip or tape, where the reinforcing material is soluble or dispersible in a liquid medium we have found that it may be applied to the film in liquid or paste form, e.g. in solution or in suspension e.g. in a highly volatile medium which can be evaporated quickly. Thus, the reinforcement, in liquid or paste form, may be applied to the film so as to provide the required localised line of weakness, e.g. by painting or printing on to the film two parallel lines of reinforcement. Obviously the reinforcement must be capable of bonding to the film after evaporation of any solvent or suspending medium, or after curing if a curable reinforcement is applied in an uncured state; the selection of compatible film and reinforcement will present no difficulty to the skilled man. As examples of such reinforcement compositions may be mentioned ink and paint compositions containing polymeric materials in solution or suspension e.g. polyurethane, polyvinylchloride and acrylic based paints. The requirement is that when dried or cured, as the case may be, the reinforcement can form a continuous sheet which has sufficient tensile strength to retain its integrity and which bonds to the film sufficiently strongly, when employed according to the invention, to provide the desired reinforcing effect. Such reinforcement is suitably applied to give a thickness for the dry reinforcement within the range 0.1–2 mm, preferably 0.2–1 mm.

The reinforcement may be applied to the surface of the plastic film or, if it is in strip or tape form, incorporated partly or wholly within its thickness. For example, it may be bonded to the surface, rolled on to heat-softened film (e.g. immediately after extrusion), or rolled into heat-softened film (e.g. immediately after extrusion) or the combination may be submitted to radio frequency welding. Where the reinforcement is bonded to the surface using an adhesive, adequate adhesion may be obtained by use of a pressure sensitive adhesive, although other adhesives, e.g. heat cure or solvent types may be employed, as also may solvent welding techniques employing solvents for the film itself; all that is required of the bond between the reinforcement and the film is that the line of weakness is defined, and that the strength of the bond is sufficiently great to ensure that the film tears before the reinforcement is displaced.

Preferred adhesives are permanent tack adhesives particularly those based on resin modified rubbers.

Where polyester, for example poly(ethylene terephthalate), is employed either as the film to be reinforced or as the reinforcing material, bonding of the film and reinforcement may conveniently be effected by employing the polyester in the form of a laminate with an easily heat sealable material, for example polyethylene or vinylidene chloride, the bonding being brought about using the heat sealable plastic as a 'cement' using conventional heat bonding techniques. It will be apparent to the skilled man that other known methods of improving the ease with which adhesion can be effected may be employed, e.g. electrical discharge and chemical surface treatment of polyethylene. Film or reinforcement which is a laminate of materials having different properties, e.g. to impart ease of adhesion or bonding by other methods may be employed.

The strength of the reinforcement is not critical, since the use of even quite modest reinforcement is generally advantageous. The strength of the reinforcement will usually be a function of its composition and it width and thickness. These may be varied at will, but the thickness of the reinforcement will not be so great that its flexibility is lost. Usually the reinforcement will be between 0.01 and 2 mm thick, preferably between 0.05 and 0.5 mm thick. It will be apparent that the thicker reinforcement will be employed on heavy duty articles made from thick plastic film, e.g. agricultural sacks.

Thus, since the film to which the reinforcement may be applied will usually be from 0.01 to 0.2 mm thick, preferably from 0.02 to 0.1 mm, and more preferably from 0.03 to 0.075 mm thick, the thinner reinforcement will usually be applied to the thinner films, and the thickest reinforcement to the thicker films. It is often found that a suitable combination will be the use of film and reinforcement of similar thickness.

The reinforcement may be of any colour, and may be patterned or carry script, e.g. indicating where the tear should be made.

The surface of the reinforcement may be roughened, e.g. by abrasion, by a surface moulding operation or merely as a result of exposure of a textile surface. 'Gripping points' by means of which the reinforcement may be gripped conveniently to facilitate tearing may form an integral part of the reinforcement, or may be attached thereto.

The invention may be applied to film to be torn from a point which is not at an edge, for example where the film is in the form of a cylindrical tube which is to be torn around its circumference at a distance from the ends of the tube; and where the tear is to originate at a point which is not at an edge it has been found desirable to perforate the film at a point on the line of weakness of the reinforcement at or near the point (hereinafter referred to as the 'give point') at which tension is first applied to the film at the commencement of the tearing operation. While the perforation may be made at the give point itself we have found that it is advantageous to make the perforation sufficiently close to the give point to weaken the film remaining between the give point and the perforation so that tearing may commence with less effort than if the perforation were not present.

While the perforation may be effected by any appropriate cutting or penetrating means, for example scissors or knife blade, we have found that mere pricking of the plastic film, as with a pin point, may be quite sufficient to effect the desired increase in tearability.

The improvement in tearability obtained by such a perforating operation has been found to be advantageous not only when the give point is not at an actual edge that is sharply defined but also when films which are tear resistant either due to thickness or to the inherent strength of particular materials, e.g. 'Melinex' (RTM), are to be torn.

Preferably a means for effecting perforation of the plastic film according to this aspect of the invention is included as a component of the plastic film product incorporating flexible reinforcement as described above, and we have found this particularly convenient if the reinforcement means employed project beyond the surface of the plastic film to provide gripping means by which the reinforcement may be gripped during the tearing operation; the perforating means may then form a component of the gripping means. The perforating means may be temporarily or permanently affixed to the gripping means. When the gripping means comprises two or more strips or tapes two surfaces of which lie together, preferably by weak adhesion, the perforating means may be located between the said surfaces so that it is protected until required for use, when it may be exposed.

The invention is now described in more detail with reference to some embodiments thereof and with the aid of the accompanying drawings (not to scale) in which:

FIGS. 20(a), 20(b) and 20(c illustrate the application of the invention to a tubular plastic film article which has no sharply defined edge at which the tear is to commence.

Figure 1:
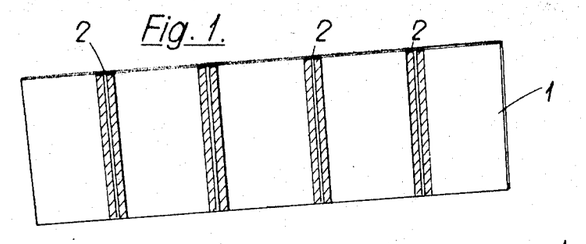
FIGS. 1 to 3 are perspective views of plastic, e.g. polyethylene, film modified according to the invention.

Referring to FIG. 1, a thin film of polyethylene (1) has applied to the surface thereof a plurality of reinforcement strips (2) each consisting of a double line of an acrylic-based paint applied by a printing operation following extrusion and cooling of the film. The reinforcement strips may be applied at predetermined distances apart, or to a more complex predetermined pattern, to facilitate tearing of the film to a desired outline.

Figure 2:
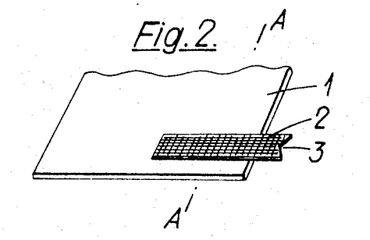
Figure 3:
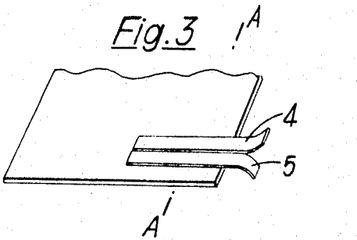

FIG. 2 represents a film to the surface of which has been bonded reinforcement 2 consisting of a strip of linen scrim having a line of weakness along its length and which extends beyond one edge of the film and has at its end an incised notch 3 which aids tearing. In FIG. 3, the strip of linen scrim is replaced by two abutting or closely spaced parallel strips, 4,5 of self-adhesive plastic tape, e.g. Sellotape (Registered Trade Mark). With this version of the invention there is, of course, no need for an incision.

Figure 4:
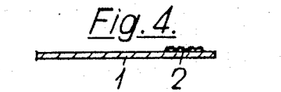
FIGS. 4 and 5 show cross-sections of the films of FIGS. 2 and 3 through the line A A.
Figure 5:
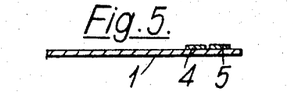

The articles of FIGS. 2 and 3 are shown in cross-section along the line A-A in FIGS. 4 and 5 respectively, in which the thickness of the plastic film and of the reinforcement are very much exaggerated.

Figure 6:
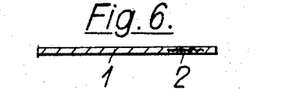
FIGS. 6 and 7 show alternative cross-sections for each of the films shown in FIGS. 2 and 3.
Figure 7:
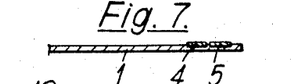

In an alternative embodiment, the reinforcement may be part or wholly within the thickness of the film, as illustrated in FIGS. 6 and 7.

Figure 8:
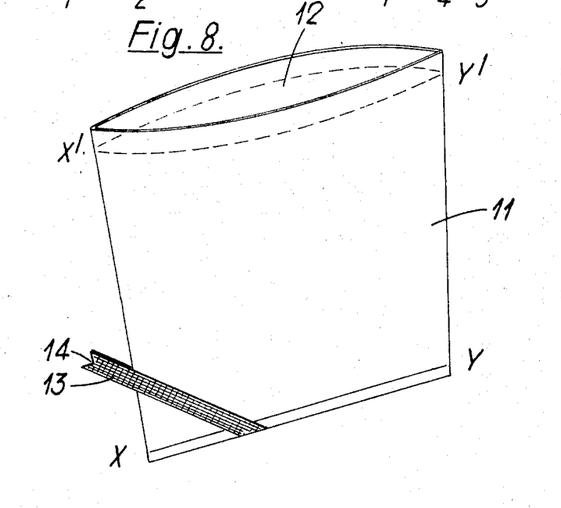
FIG. 8 is a perspective view of a bag or sack modified in one way in accordance with the invention.

FIG. 8 represents a bag or sack in accordance with the invention. It comprises a tube of, for example, polyethylene film flattened to provide two walls 11, 12 sealed together along the line XY e.g. by heat sealing, and to be sealed along or near the line X'Y' after being filled, e.g. with fertiliser. Bonded to or placed within each wall and arranged diagonally across a corner of the bag is a strip 13 of linen scrim. The strips are arranged so that they are naturally in superimposed relationship or else may be brought into such relationship for tearing, and one end of each strip extends beyond one edge of the bag, the two free ends preferably being bonded together and the bonded ends being provided with an incised notch 14 to aid tearing. The reinforcement may be applied to, or incorporated in, the plastic tube during its manufacture.

Figures 9, 10, 11, 12, 13:
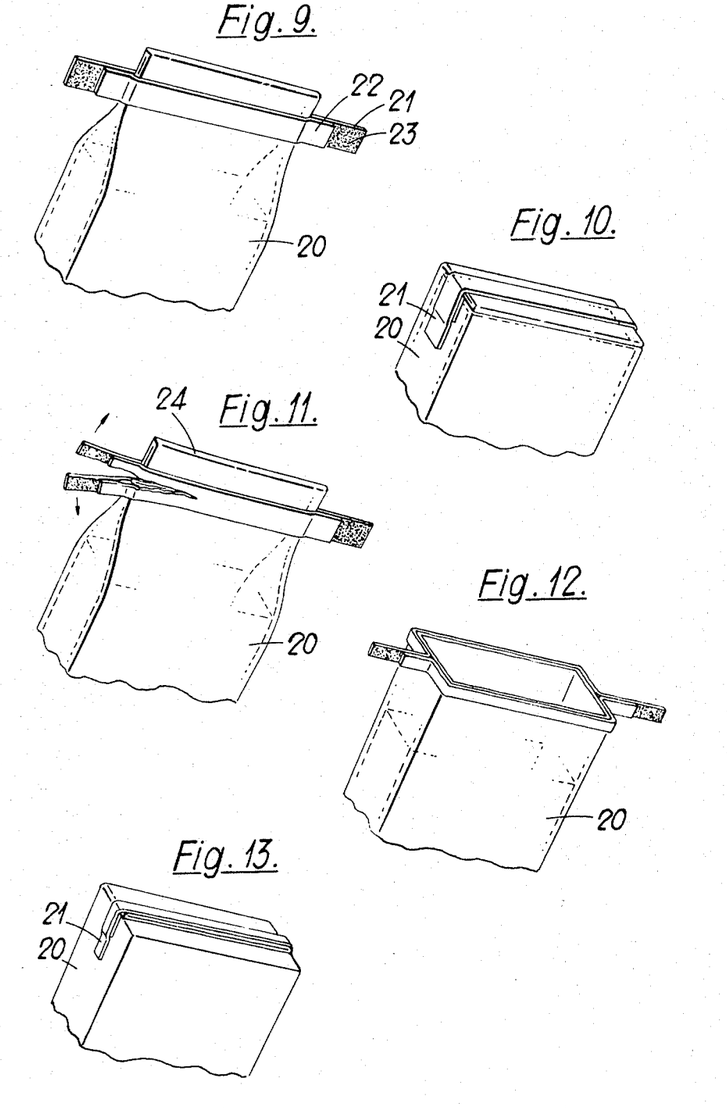
FIGS. 9 to 13 show an embodiment of the invention in which the reinforcement can be employed as a temporary closure means.

FIGS. 9 to 13 show a container 20 made from plastic film in which the reinforcement consists of two linen strips 21 and 22 one of the strips being longer than the other and extending beyond it at both ends as shown, so that an adhesive portion of strip 23 is exposed at each side of the container. FIG. 10 shows the container closed, with the exposed adhesive portions of 21 pressed against the sides of the container. FIG. 11 shows the container being torn open, the sealed end portion 24 being removed and leaving the opened package as shown in FIG. 12. Temporary reclosure of the container may be effected, as illustrated in FIG. 13, by folding the free end of the container and pressing the adhesive portions of the remaining reinforcement 21 against the container sides as before. The adhesive employed in an application such as this is necessarily one which allows the bond to be broken and remade, (e.g. a permanent tack adhesive).

Figure 14:
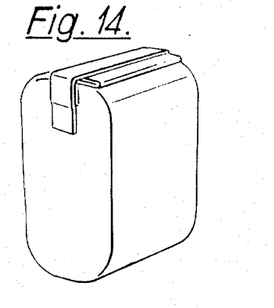
FIGS. 14 through 16 show the principle of the invention applied to a bag.
Figure 15:
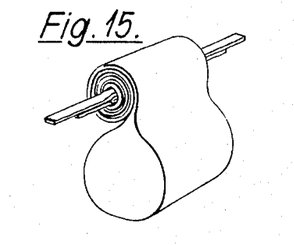
Figure 16:
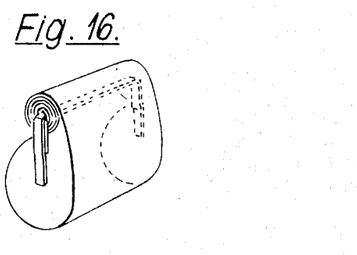

FIGS. 14–16 show the same principle applied to a bag, the top of which can be rolled down for closure as the contents are progressively used.

The remaining Figures, i.e. FIGS. 17a–17d, 18a–18b, 19a–19d and 20a–20d, illustrate the use of perforating means in accordance with the invention.

Figure 17A:
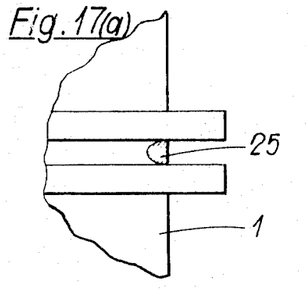
FIGS. 17(a), 17(b), 17(c) and 17(d) are diagrammatic illustrations of a sheet of plastic film to which is applied a pair of reinforcement strips, additionally illustrating the effect of a perforation or other localized line of weakness.
Figure 17B:
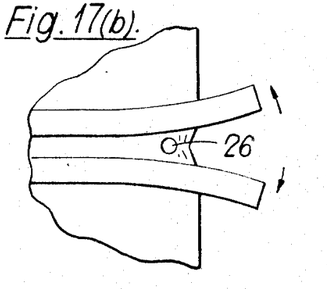
Figure 17C:
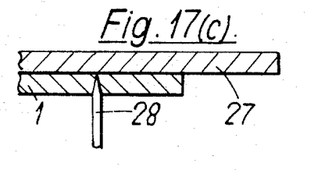

In FIG. 17, FIG. 17a is a diagrammatic representation of a sheet of plastic film 1 to which is applied a pair of reinforcing strips, the strips being applied to the same side of the film substantially parallel to each other with a narrow longitudinal gap between them, and projecting some way beyond the edge of the film. The shaded area 25 represents the region adjacent to the give point in which the perforation may typically be made. This area will usually be within about 0.5 cm. of the give point. FIG. 17b is a diagrammatic view of the same system showing the effect of a perforation 26 adjacent to the give point when the tearing operation is commenced by pulling apart the ends of the strips in the direction of the arrows.

Figure 17D:
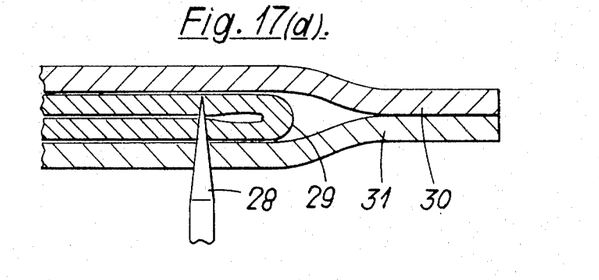

Although in the above diagrams two parallel reinforcing strips are shown (since the illustration of the principle of the invention is there-by facilitated) it is not, of course, essential to use two parallel strips; when a single reinforcing strip comprising a localised line of weakness is applied to one side of the film perforation of the film in the appropriate area may be effected by application of the perforating means to the exposed surface of the film. This is illustrated in sectional view in FIG. 17c in which 1 is the plastic film, 27 is the reinforcing strip and 28 is a perforating means (e.g. a pin). When single reinforcing strips each comprising a localised line of weakness are applied to both sides of the film, the perforation in the plastic film may be effected by penetrating the reinforcement itself at a point on the line of weakness. This is shown in FIG. 17d, which is a sectional view of a plastic bag or like article having two walls formed out of a continuous piece of plastic film having a creased edge 29. Two reinforcing strips, 30 and 31, are applied, one to each wall of the bag, and adhere to each other region in which they project beyond the edge of the bag. A perforating means 28 is shown penetrating one reinforcing strip 31 and the film constituting the walls of the bag adjacent to the give point at the edge of the bag.

Figure 18A:
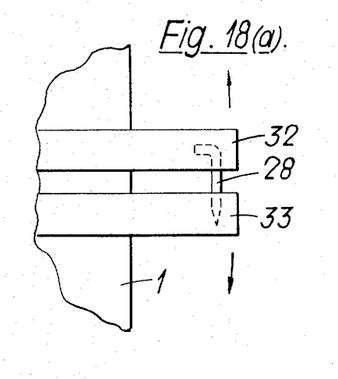
FIGS. 18(a) and 18(b) illustrate a method of imbedding a perforated means in the reinforcement strip.
Figure 18B:
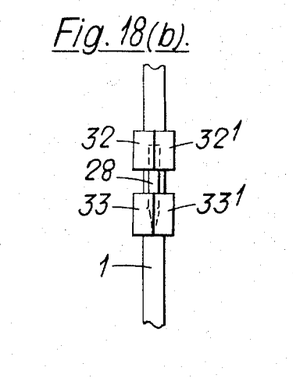

FIG. 18 illustrates one method of embedding a perforating means, e.g. a small pointed piece of metal 28 in the reinforcement, in an embodiment in which two pairs of parallel reinforcing strips are attached, one pair to edge side of the film 1. FIG. 18a is a side view and FIG. 18b is an end-on view of the strips of reinforcing material 32, 32', 33, 33'. The perforating means is secured between the adhesive strips in the region in which the strips project beyond the edge of the film, and its point may be exposed by separating the ends of the strips in the direction of the arrows.

Figure 19A:
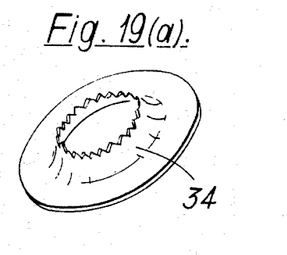
FIGS. 19(a), 19(b), 19(c) and 19(d) illustrate a perforating means made by punching a hole through a piece of metal so that the raised portion constitutes a serrated edge.

FIG. 19 illustrates a perforating means 34, shown in perspective in FIG. 19a, made by punching a hole through a piece of metal so that the edges of the hole are raised and constitute a sharp serrated edge. FIG. 19b is a sectional view showing the perforating means 34 enclosed between two adhesive reinforcing strips 35, 36 projecting beyond the edge of the filml, so that it is protected until required for use.

Figure 19B:
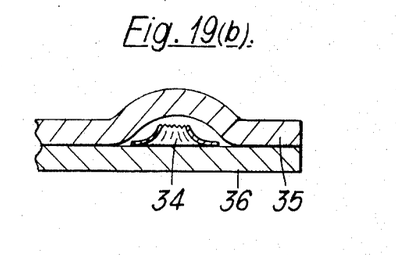
Figure 19C:
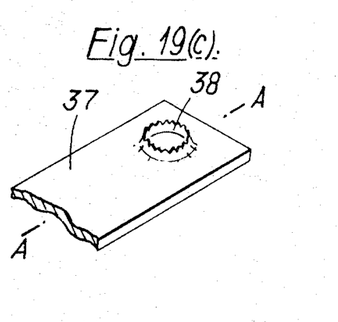
Figure 19D:
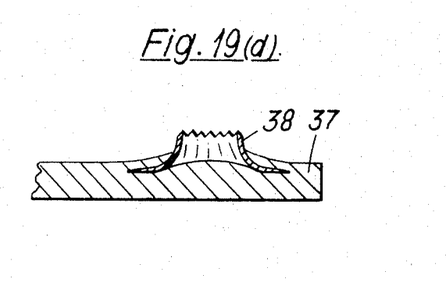

FIG. 19c shows an alternative method of affixing a perforating means as described above by welding it to a plastic reinforcing strip. FIG. 19c is a perspective view of such a strip, 37, incorporating a perforating means 38, and FIG. 19d is a section along the line AA' of FIG. 19c.

Figure 20A:
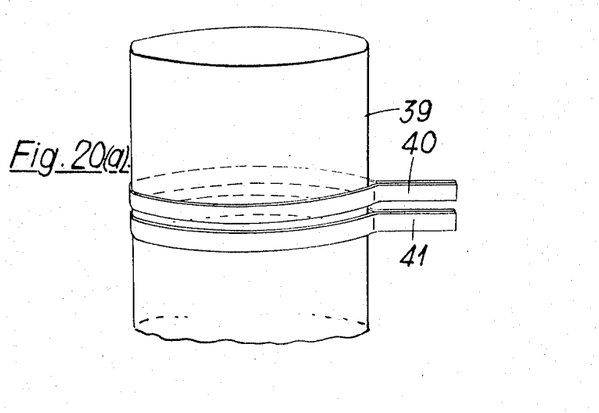
Figure 20B:
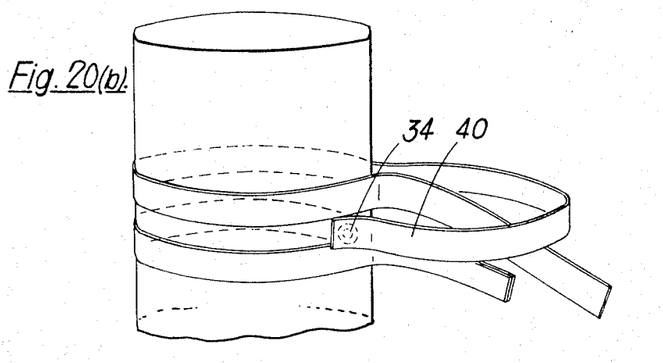
Figure 20C:
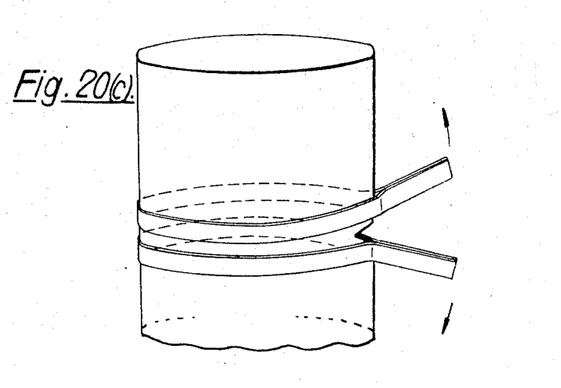

FIG. 20 illustrates the application of the invention to a tubular plastic film article which has no sharply defined edge at which the tear is to commence. The tearability of such an article may be improved merely by applying to its surface reinforcing material. This is illustrated in FIG. 20a, which is a perspective side view of a tubular film article 39 having applied to it two parallel reinforcing strips 40, 41, each of which contacts the entire circumference of the tubular article and has two ends which are superimposed on each other in the region of the strips projecting beyond the wall of the tube. However, it is particularly advantageous to perforate the plastic film before it is torn when it is in the form of a tube, and this may be done by means of a device as illustrated in FIG. 19a, attached to the reinforcement as illustrated in FIG. 19b or FIG. 19d, and used as illustrated in FIG. 20b with a perspective side view showing one end of one reinforcing strip 40, bearing the perforating means 34, detached from the other end of the same strip and brought into contact with the wall of the tubular article on the line of weakness between the reinforcing strips so as to effect perforation of the film. The tubular film article may then be torn as shown in FIG. 20c.

The following Examples serve to further illustrate the invention.

EXAMPLE 1.

A single layer of low-density polythene film, 0.005 inches thick and approximately six inches square had applied across it, from one edge to the other, a strip of 0.5 inch side linen fabric adhesive tape (Sellotape Products Ltd.). The film was turned over and a second strip of the same tape applied to the other side of the film, superimposed upon the first. The tapes projected approximatley one inch from the edge of the film, and were stuck together in this region. A cut was made in the double layer of tape, extending from the end of the tapes along the centre of the tapes for approximately 0.5 inch; that is, not extending as far as the edge of the film. When the ends of the tapes were grasped with both hands, ne finger and thumb gripping one each side of the cut, a tearing action caused a smooth tear to propagate along the centre of the tapes and completely across the film.

EXAMPLE 2

A sheet of film as in Example 1 had applied across one face two parallel strips of 0.25 inch wide transparent adhesive tape (Sellotape'-RTM), separated by a narrow gap (approx. 0.05 inch). A second pair of tapes was applied to the other face, superimposed upon the first pair, and adhering to the first pair where they projected beyond the edge of the film, a distance of approximately one inch. When the end of each double layer of tape was grasped and the two pulled apart, a smooth tear propagated in the polythene film between the pairs of tapes.

EXAMPLE 3

Two sheets of film as in Example 1 were superimposed and heat-sealed along all four edges so as to make a closed bag. Two strips of adhesive fabric tape as in Example 1 were applied diagonally across one corner of the bag, extending beyond the edge for approximately one inch, one strip being applied to each face of the bag, and the two strips being superimposed on each other. A cut was made in the end of the tapes as in Example 1, and tearing along the centre of the tapes caused the corner of the bag to be torn off cleanly.

EXAMPLE 4

A bag as in Example 3 had two strips of fabric tape as in Example 1 applied in superimposed relationship from the centre of the bag to the centre of one of the edges of the bag and projecting beyond the edge for approximately one inch. A cut was made in the tapes, and tearing along the centre of the tapes caused a clean tear to propagate in both walls of the film bag from the edge of the bag up to the other end of the tapes at the centre of the walls of the bag. Beyond this point, tearing required much more force and produced a rough, irregular tear due to stretching of the film.

EXAMPLE 6

Film and tapes were used as in Example 1, but before the tapes were torn, the tip of a scalpel blade was used to penetrate one layer of tape and the layer of film, approximately 0.1 inch from the edge of the film. Tearing of the film along the centre line of the tapes was initiated much more easily than in Example 1.

EXAMPLE 7

A sheet of 'Melinex' (RTM) poly(ethylene terephthalate) film biaxially drawn, 0.001 inch thick and approximately six inches square had applied across it, from one edge to the other, two parallel strips of black pvc adhesive tape ('Klingfast' RTM 2702, Rotunda Ltd, Manchester, England) each 0.5 inch wide and approximately 0.007 inches thick with a narrow gap of approximately 0.05 inches between them. A second pair of tapes was applied to the opposite side of the film, in superimposed relationship. The two pairs of tapes projected beyond one edge of the film, and adhered together in overlapping region. Tearing of the film between the strips of tape required considerable force to initiate, but then progressed smoothly and cleanly between the strips of reinforcement.

EXAMPLE 8

A tube of 'Melinex' (RTM) film, 0.001 inch thick, and approximately 4 inches diameter had applied to it two strips of the pvc adhesive tape of Example 7, each strip running round the circumference of the tube, and the two ends of each strip projecting approximately one inch from the wall of the tube and adhering together. The two strips were applied parallel and with a narrow gap (approximately 0.05 inches) between them. The tube could not easily be torn open by pulling the tapes apart. A small perforation was then made in the wall of the tube between the tapes, using a pointed piece of metal adhering to one of the tapes. The tube could then be torn open smoothly along the line separating the tapes.

EXAMPLE 9

A single sheet of low density polyethylene film, 0.005 inches thick, had applied across one surface, from one edge to the other, two parallel lines of a polyurethane based paint (ICI 'Dulux Super 3'), each line being 1 cm wide and about 0.2 mm thick. The lines were 2 mm apart. The paint was allowed to dry thoroughly (24 hours). When the ends of the two painted lines and the underlying film were gripped and pulled to tear the film between the lines the film tore clearly along the line of weakness between the lines of paint.

EXAMPLE 10

A strip of linen tape about 2 cm wide, 0.5 mm thick, 20 cm long and of mesh size 1 mm. was bonded to a sheet of polyethylene film 0.5 mm thick by heat welding. This involved applying the tape to one surface of the film and laying on the surface of the tape a heating iron heated to about 130°C (i.e. sufficient to soften the polyethylene sheet) so that the tape could be pressed into it to a depth of about 0.2 mm. The tape firmly bonded to the sheet after cooling. A notch was made in the end of the tape which extended slightly (1 cm) beyond one edge of the film. On tearing the tape from this notch along its length the tape tore clearly, as did the film to which it was bonded.

What we claim is:

1. A container comprising a tube of plastic film sealed at one end to provide a bag having two walls and a common sealed edge, a first flexible reinforcement strip attached to one wall and extending from a point in said common edge diagonally across a corner of said bag outwardly to a point beyond said bag, another similar flexible reinforcement strip attached to the other wall and extending from said point in said common edge diagonally across the same corner of said bag and outwardly beyond the bag so as to be in superimposed relationship with said first strip, the ends of said strips which extend beyond said bag being bonded together and said bonded ends being provided with a notch defining a line of localized weakness whereby tearing of said strips along said notch permits tearing of said container to open the same.

2. A container according to claim 1 wherein the reinforcement strip comprises a woven textile web or plastic sheet.

3. A container according to claim 2 wherein the reinforcement strip comprises regenerated cellulose, polyamide, polyester, polyurethane, polyvinyl, acrylic or polyolefin polymer.

4. A container according to claim 2 wherein the reinforcement strip consists of two substantially parallel strips of reinforcing material disposed in abutting or closely spaced edge-to-edge relationship.

5. A container according to claim 2 wherein the reinforcement strip is from 0.01 – 2 mm. thick.

* * * * *